United States Patent [19]

Jeffers

[11] Patent Number: 5,126,871
[45] Date of Patent: Jun. 30, 1992

[54] METHOD AND APPARATUS FOR REDUNDANT COMMUNICATION OF OPTICAL SIGNALS WITH DISTORTION CANCELLATION

[75] Inventor: Michael F. Jeffers, Flourtown, Pa.
[73] Assignee: General Instrument Corporation, Hatboro, Pa.
[21] Appl. No.: 436,614
[22] Filed: Nov. 15, 1989
[51] Int. Cl.⁵ .............................. H04B 9/00
[52] U.S. Cl. .................... 359/154; 359/161; 359/180; 359/173; 359/181; 359/188
[58] Field of Search ............... 455/617, 612, 611, 609, 455/615, 616, 618, 619; 370/3; 250/227.21, 227.27; 359/110, 156, 152-154, 173, 159-162, 180, 181, 183, 187, 188

[56] References Cited

U.S. PATENT DOCUMENTS

| | | | |
|---|---|---|---|
| 3,931,512 | 1/1976 | Kent et al. | 250/199 |
| 4,052,611 | 10/1977 | Fish | 359/173 |
| 4,075,474 | 2/1978 | Straus et al. | 250/199 |
| 4,183,054 | 1/1980 | Patisaul et al. | 358/86 |
| 4,393,518 | 7/1983 | Briley | 359/166 |
| 4,472,725 | 9/1984 | Blumenkranz | 330/149 |
| 4,617,522 | 10/1986 | Tarbutton et al. | 330/149 |
| 4,625,178 | 11/1986 | Mannerstrom | 330/149 |
| 4,792,751 | 12/1988 | Blumenkranz et al. | 324/57 |
| 4,868,894 | 9/1989 | Gilden et al. | 359/162 |
| 4,918,747 | 4/1990 | Bekooij | 359/161 |
| 4,927,221 | 5/1990 | Kiyono | 359/184 |
| 4,965,856 | 10/1990 | Swanic | 359/112 |
| 5,031,236 | 7/1991 | Hodgkinson et al. | 359/192 |

FOREIGN PATENT DOCUMENTS

| | | | |
|---|---|---|---|
| 003785 | 7/1981 | European Pat. Off. | |
| 2524229 | 9/1983 | France | 455/612 |
| 0127828 | 7/1985 | Japan | 455/618 |
| 0032730 | 2/1987 | Japan | 455/618 |
| 0058735 | 3/1987 | Japan | 455/615 |
| 0220533 | 9/1989 | Japan | 455/612 |

Primary Examiner—Edward L. Coles, Sr.
Assistant Examiner—Jill Jackson
Attorney, Agent, or Firm—Barry R. Litsitz

[57] ABSTRACT

A fiber optic communication system provides parallel paths to enable cancellation of even order harmonic distortion components. A pair of parallel optical fibers is provided. Each of the fibers is coupled to a corresponding transmitter at one end of the pair and to a corresponding receiver at the other end of the pair. The transmitters are modulated with an input signal applied to the transmitters at a 180° phase differential. The 180° phase shifted signals are combined at the receivers to recover the input signal while cancelling even order distortion products introduced by the transmitters. A method is provided for balancing the system upon installation.

13 Claims, 1 Drawing Sheet

5,126,871

METHOD AND APPARATUS FOR REDUNDANT COMMUNICATION OF OPTICAL SIGNALS WITH DISTORTION CANCELLATION

BACKGROUND OF THE INVENTION

The present invention relates to analog optical transmission systems, and more particularly to an apparatus and method for canceling distortion components introduced by a laser transmitter.

Optical transmission systems are currently being implemented for use in various communication applications. For example, telephone systems are now in use that utilize fiber optic technology to transmit voice and data signals over long distances. Similarly, cable television networks are now available wherein fiber optic technology is used for the transmission of both analog and digital signals.

Prior to the implementation of optical transmission networks, cable television programs were carried as radio frequency ("RF") signals over electrical coaxial cables. In fiber optic transmission systems, communication lasers are used for the transmission of the multichannel television signals. The RF signals are used to modulate a light source, and the modulated light is transmitted along the length of an optical fiber.

Optical transmission systems provide substantial benefits, including a virtually unlimited bandwidth and improved system performance. However, harmonic distortion is a major limitation in analog amplitude modulated optical communication transmission systems. Such distortion, and particularly second order distortion, is introduced by the laser which transmits signals over the optical communication system.

It would be advantageous to provide a method and apparatus for canceling second and higher even order distortion in an analog optical transmission system. It would be further advantageous to provide such a method and apparatus that is economical, readily manufacturable, and reliable. The present invention provides a method and apparatus for providing these and other advantages.

SUMMARY OF THE INVENTION

In accordance with the present invention, apparatus is provided for communicating signals over an optical fiber transmission path. A first light source is coupled to a first optical fiber, and modulated with an input signal. A second light source is coupled to a second optical fiber. Means are provided for shifting the phase of the input signal 180°. The second light source is modulated with the 180° phase shifted input signal. The modulated light from the first light source is received at a remote end of the first fiber to provide a first output signal. The modulated light from the second light source is received at a remote end of the second fiber to provide a second output signal. The first and second output signals are combined to recover the input signal while canceling even order distortion products contained in the first and second output signals.

The first and second output signals may be electrical signals that are combined in a transformer. Where the nnvention is practiced in a cable television distribution system, the input and output signals will typically comprise multichannel RF television signals.

In a preferred embodiment, the first and second optical fibers are identical fibers run in parallel. The first and second light sources are matched lasers, and the receiving means at the remote end of the fibers comprise matched photodetectors. The parallel fibers may be provided adjacent to each other in a single cable.

Means are provided for adjusting the amplitude of one or both of the output signals to provide a desired balance. Means are also provided for adjusting the phase of one or both of the output signals to provide a desired balance.

The present invention also provides a method for communicating signals over an optical fiber transmission path. An input signal is transmitted over a first fiber in a pair of optical fibers. The input signal is transmitted over the second fiber in said pair 180° out of phase with respect to the transmission on the first fiber. The 180° phase shifted signals are received at a remote end of the fiber pair, and combined to recover the input signal while canceling even order distortion products introduced by the transmitting steps.

In order to align the optical transmission system, a test signal is transmitted instead of an input signal over each of the first and second fibers. The test signal is in phase on both of the fibers, and is received on both fibers at the remote end of the fiber pair. The test signal received from the first fiber is combined with the test signal received from the second fiber, and the combined signal is monitored to determine its amplitude. One or more parameters at the remote end of the fiber pair is adjusted to null the combined signal. One parameter that may be adjusted is the level of the test signal received from one of the fibers. Another parameter is the effective length of one of the fibers.

DETAILED DESCRIPTION OF THE INVENTION

Figure 1:
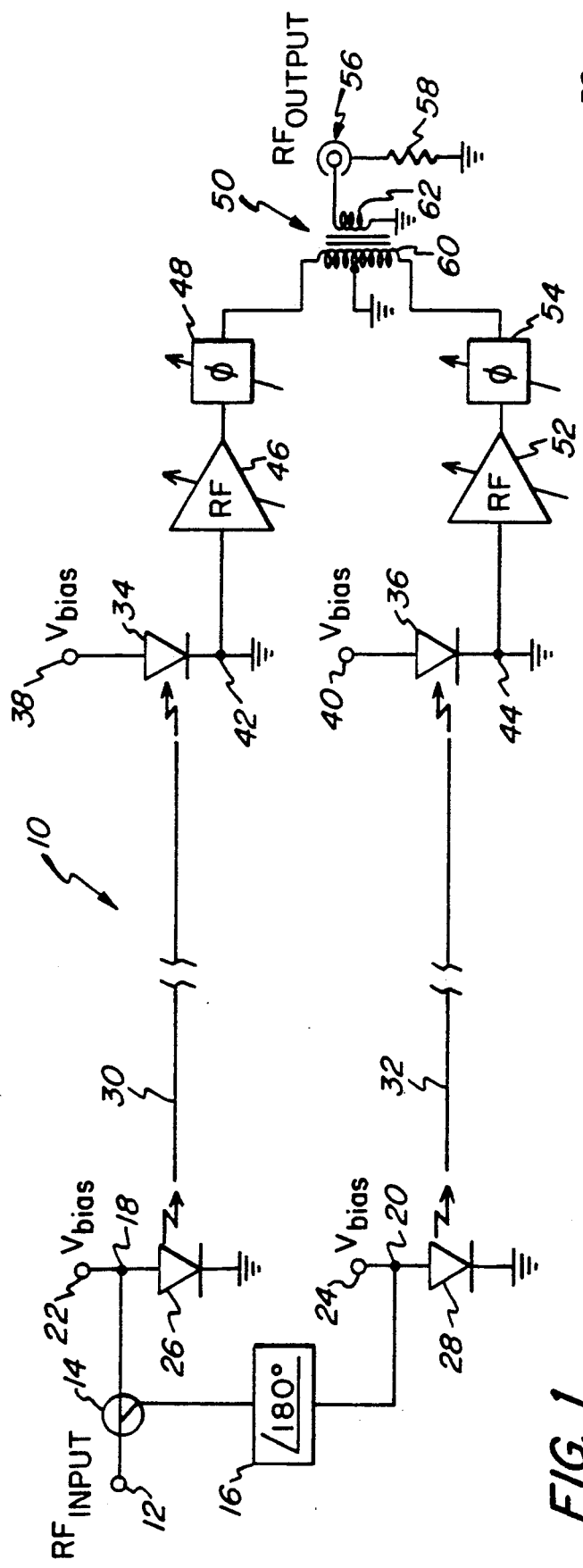
FIG. 1 is a schematic diagram of apparatus in accordance with the present invention.

Referring to FIG. 1, a schematic diagram generally designated 10 illustrates apparatus in accordance with the present invention for the communication of signals over an optical fiber transmission path wherein the even order harmonic distortion components are canceled. The apparatus is useful in optical transmission systems for a variety of applications. For example, the apparatus can be used in connection with a cable television system, in which television signals in a conventional RF format are used to modulate a laser transmitter for optical communication via a fiber optic cable.

In such a system, an RF input terminal 12 is provided for receipt of a conventional cable signal consisting of a plurality of RF television channel signals. This signal is coupled to a directional RF splitter 14, that splits the analog electrical input signal from terminal 12 into first and second signal portions. The first signal portion is coupled to a laser transmitter 26 and modulates the laser to provide communication over a first fiber 30. Laser transmitter 26 is coupled to a bias voltage at terminal 22 in a conventional manner.

The second signal portion from splitter 14 is shifted in phase by 180° by well known phase shifting circuitry 16. For example, a wide band RF transformer may be used. The output of phase shift circuitry 16 is coupled to a second laser transmitter 28 which, like transmitter 26, is supplied with a bias voltage at terminal 24. The 180° phase shifted RF input signal modulates laser transmitter 28, for transmission of the signal over optical fiber 32.

In accordance with the present invention, it is preferable to provide a matched system wherein the light sources (i.e., laser transmitters 26, 28) driving fibers 30, 32 are a matched pair. Also, the RF signals input to laser transmitter 26 and laser transmitter 28 at terminals 18, 20, respectively, should be identical in all respects except for the 180° phase shift. Thus, phase shift circuitry 16 is designed to provide unity gain so that the amplitude of the RF input signal at terminal 18 is equal to the amplitude of the RF input signal at terminal 20.

Optical fiber 30 and optical fiber 32 should also be a matched pair. In a preferred embodiment, fibers 30, 32 are identical fibers that are run in parallel within a single cable. In order to keep the physical length of fibers 30, 32 equal, they may be glued or otherwise bonded together within the cable jacket. The physical requirements of fibers 30, 32 are dictated by the communication system requirements, including the type and power of the signals to be transmitted, the length of the cable run, and the like. Optical fibers for use in multichannel cable television transmission are known in the art and commercially available. An example of one such cable is that manufactured by Corning Glass Works and designated Model SMF-21.

Parallel optical fibers 30, 32 are run to the same location, where the fibers are coupled to photodetectors 34, 36, respectively. Preferably, the photodetectors are a matched pair. Each is provided with a bias voltage at terminals 38, 40, respectively.

Photodetector 34 receives the modulated light signal transmitted by laser transmitter 26 via fiber 30. Similarly, photodetector 36 receives the modulated light signal transmitted via fiber 32 by laser transmitter 28. The outputs of photodetectors 34, 36 at terminals 42, 44, respectively, comprise the 180° phase shifted RF input signals used to modulate laser transmitters 26, 28. RF amplifiers 46, 52 are coupled to the outputs of photodetectors 34, 36 to restore the magnitudes of the photodetector output signals to a desired level. One or both of the RF amplifiers 46, 52 can be variable, so that the amplitude of the output signals can be adjusted to provide a desired balance.

Phase shift circuits 48, 54 are also provided at the outputs of photodetectors 34, 36, respectively. One or both of these circuits may be variable to adjust the phase of one or both of the photodetector output signals to provide a desired balance. Phase shift circuits 48, 54 may comprise any well known means for adjusting the phase of an electrical signal. For example, they can comprise RC phase shift networks or simply a length of electrical cable that is shortened to provide a desired phase shift. Alternately, the length of one or both fibers 30, 32 can be physically adjusted to provide a desired phase relationship between the signals output from the fibers.

In order to cancel out even order harmonic distortion components, while recovering the RF input signal, it is desirable to adjust RF amplifiers 46, 52 to equalize the magnitudes of the output signals from the photodetectors. It is simiarly desirable to adjust the phase shift components 48, 54 to maintain the respective output signals from the photodetectors exactly 180° out of phase with respect to each other. The equal amplitude, 180° phase shifted signals are then input to an RF transformer 50 having a balanced, center tapped primary 60 and unbalanced secondary 62. When the signals input to the transformer are in perfect balance, the transformer combines the signals to add the fundamental desired signal information providing a 3 dB power gain, and cancel the even order harmonic distortions. The resultant RF output signal is coupled to a coaxial terminal 56, which may be terminated to provide a standard 75 ohm impedance 58.

The operation of the circuit of FIG. 1 can be expressed mathematically. For example, laser transmitter 26 can be modulated with an RF input signal $E_{IN}$. Fiber 30 can, in turn, be connected to a single photodetector 34 that is terminated with a 75 ohm impedance. An output voltage $E_{OUT1}$ will appear across the 75 ohm termination. $E_{OUT1}$ may be expressed as follows:

$$E_{OUT1} = K_0 + K_1 E_{IN} + K_2(E_{IN})^2 + K_3(E_{IN})^3 + K_4(E_{IN})^4 + \ldots$$

where $K_0$ is a DC component in the signal, $E_{IN}$ is the desired signal to be recovered from the fiber optic cable, $K_2(E_{IN})^2$ is a second order harmonic distortion component of the received signal, $K_3(E_{IN})^3$ is a third order distortion product, and $K_4(E_{IN})^4$ is a fourth order distortion product.

The RF input signal applied to laser transmitter 28 is 180° out of phase with $E_{IN}$, and can be expressed as "$-E_{IN}$". Therefore, the output $E_{OUT2}$ from photodetector 36 can be expressed as:

$$E_{OUT2} = -K_0 + K_1(-E_{IN}) + K_2(-E_{IN})^2 + K_3(-E_{IN})^3 + K_4(-E_{IN})^4 + \ldots = -K_0 - K_1 E_{IN} + K_2(E_{IN})^2 - K_3(E_{IN})^3 + K_4(E_{IN})^4 + \ldots$$

As shown, in $E_{OUT2}$, all of the odd order products are negative and all of the even order products are positive. Therefore, when the magnitudes of $E_{OUT1}$ and $E_{OUT2}$ are equal, and they are 180° out of phase, transformer 50 will combine the signals, effectively subtracting $E_{OUT2}$ from $E_{OUT1}$, such that all even order components are canceled and all odd order components (including the signal $E_{IN}$ to be retrieved) are doubled in power. This provides a 3 dB increase in the signal level of the RF signal to be recovered, while canceling the troublesome second order harmonic distortion components.

Where the turns ratio of transformer 50 is 1.41:1, and the transformer is designed to provide a 150 ohm input impedance across winding 60 with a 75 ohm output impedance, the combined output at 75 ohms can be expressed as:

Combined Output @75Ω = $1.41 K_1 E_{IN} + 1.41 K_3 E_{IN}^3 + \ldots$

The present invention also provides an improvement in signal to noise ratio. Noise generated in the separate paths, such as laser relative intensity noise ("RIN"), photodiode noise and RF amplifier noise is completely random in nature for each path. The random noise on each path combines as 3 dB power addition in the primary winding 60 of transformer 50, compared to the synchronous signal addition of 6 dB. The resulting effect is a carrier-to-noise improvement of 3 dB from the random noise sources in the system. Any noise already associated with the RF input signal at terminal 12 is considered to be synchronous, and the signal-to-noise ratio with respect to this aspect of noise will not be improved.

Another advantage of the present invention is that it will provide uninterrupted service in the event one of laser transmitters 26, 28 fails. Although distortion will worsen significantly in such event, program continuity will be adequately maintained until the failed laser can be repaired or replaced.

Figure 2:
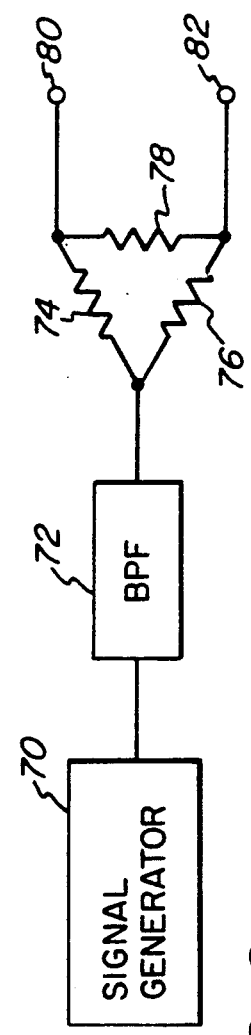
FIG. 2 is a block diagram of apparatus used in the alignment of the apparatus of FIG. 1.

FIG. 2 illustrates a test apparatus for use in balancing the system of the present invention upon installation or during subsequent maintenance. When the system is installed, it is important to maintain the physical lengths of both paths equal. Thus, all coaxial cables, connections from the RF signal sources to the laser transmitters, and the fiber optic cables should have matched lengths. This will ensure that the 180 phase differential of the signals in the paths is maintained. As noted above, fine tuning of both the signal magnitude and phase relationship is provided by RF amplifiers 46, 52 and phase adjustment components 48, 54.

In order to fine tune the magnitude and phase relationships, a test signal is applied at terminals 18 and 20 of laser transmitters 26, 28, respectively. The test signal is provided by a signal generator 70, which can be an RF continuous wave sweep generator covering the total frequency range, for example, 50 MHz to 550 MHz. A low pass filter 72 may be provided to remove any harmonics in the signal generator 70 that are above the highest frequency in this spectrum, for example, 550 MHz. This signal is then input to a passive splitter comprising 75 ohm impedances 74, 76, and 78. The identical test signal is then applied from the passive splitter via terminals 80, 82 to terminals 18, 20 of laser transmitters 26, 28, respectively. The resultant signals output by the laser transmitters and carried on fibers 30, 32 will be identical and in phase.

At the receiver end of the system, a conventional sweep detector (not shown) is coupled to RF output terminal 56, and centered around 350 MHz. The level of the test signal output from one or both of photodetectors 34, 36 is adjusted via RF amplifier 46 and/or RF amplifier 52. Similarly, the phase of the received test signal on one or both paths is adjusted using phase shifter 48 and/or phase shifter 54. As noted, the phase shifters adjust the effective length of the respective communication paths to maintain the desired 180° out of phase relationship. When the system is properly adjusted, the spectrum analyzer will show a null across the entire spectrum of 50 to 550 MHz.

Where the cable length adjustment is provided by physically modifying the length of one of the cable paths, the length of the adjustment mechanism should be reasonably long (e.g., ±5 feet compensation) to allow for balance or at least to determine which fiber is the longer of the two to allow a compensating reconnection of the long fiber to its respective photodetector.

Figure 3:
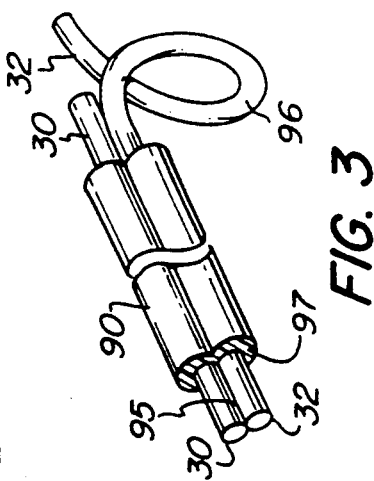
FIG. 3 is an illustration of a cable comprising two parallel optical fibers bonded together in accordance with the present invention, wherein one of the fibers is longer than the other for adjustment at one end of the cable.

FIG. 3 illustrates a cable 90 in which two individual optical fibers 30, 32 are bonded together at a common seam 95. A cable jacket 97 encloses the bonded fiber pair. In order to physically adjust the overall length of the cable paths with respect to one another, fiber 32 is provided with slack at one cable end as indicated by coil 96. The slack enables the cable installer to balance the system as noted above when connecting fiber 94 to its respective photo detector.

It will now be appreciated that the present invention provides apparatus for communicating signals over an optical fiber transmission path wherein even order harmonic distortion components are canceled. The invention also provides a method for balancing the system. Those skilled in the art will appreciate that the level control and phase compensation means can be provided in just one of the parallel communication paths, or alternately can be provided in both paths as shown.

Although the invention has been described in connection with a preferred embodiment thereof, it will be appreciated that numerous adaptations and modifications may be made thereto without departing from the spirit and scope of the invention, as set forth in the claims.

What is claimed is:

1. Apparatus for communicating signals over an optical fiber transmission path comprising:
   a first light source;
   means for coupling said first light source to a first optical fiber;
   means for modulating said first light source with an input signal;
   a second light source;
   means for coupling said second light source to a second optical fiber;
   means for shifting the phase of said input signal 180°;
   means for modulating said second light source with said 180° phase shifted input signal;
   means for receiving light modulated by said input signal from said first light source at a remote end of said first fiber to provide a first output signal;
   means for receiving light modulated by said 180° phase shifted input signal from said second light source at a remote end of said second fiber to provide a second output signal;
   means for adjusting the effective length of at least one of said first and second optical fibers to maintain a 180° phase shift between the first and second output signals, in response to test signals received and combined at the remote ends of said fibers until nulled by said adjusting means; and
   means for combining the first and second output signals to recover said input signal while canceling even order distortion products contained in the first and second output signals.

2. Apparatus in accordance with claim 1 wherein said first and second output signals are electrical signals, and said combining means comprise a transformer.

3. Apparatus in accordance with claim 2 wherein said input signal and said first and second output signals are RF signals.

4. Apparatus in accordance with claim 1 wherein said first and second optical fibers are identical parallel fibers.

5. Apparatus in accordance with claim 1 wherein said first and second light sources are matched lasers.

6. Apparatus in accordance with claim 5 wherein said receiving means comprise matched photodetectors.

7. Apparatus in accordance with claim 6 wherein said first and second optical fibers are identical parallel fibers.

8. Apparatus in accordance with claim 7 wherein said fibers are bonded together within a single cable.

9. Apparatus in accordance with claim 1 further comprising:
   means coupled to one or both of said receiving means for adjusting the amplitude of one or both of said first and second output signals, respectively, to provide a desired balance.

10. A fiber optic communication system comprising:
a pair of parallel optical fibers, each coupled to a corresponding transmitter at one end of said pair and to a corresponding receiver at the other end of said pair;
means for modulating said transmitters with an input signal applied to the transmitters at a 180° phase differential;
means for combining the 180° phase shifted signals at said receivers to recover said input signal while canceling even order distortion products introduced by said transmitters; and
means for nulling test signals transmitted over said fibers and received and combined at said receivers, by adjusting the effective length of at least one of said fibers.

11. A communication system in accordance with claim 10 wherien said combining means comprises a transformer.

12. A communication system in accordance with claim 10 further comprising:
means for balancing the amplitudes of the 180° phase shifted signals prior to said combining means.

13. A method for calibrating optical signal communication apparatus that transmits first and second optical signals having a 180° phase differential over first and second optical fibers, respectively, for combination at a receiver to recover an input signal while canceling even order distortion products in said first and second optical signals, comprising the steps of:
transmitting a test signal over each of said first and second fibers, said test signal being in phase on both of said fibers;
receiving said test signal on both fibers at said receiver;
combining the test signal received from said first fiber with the test signal received from said second friber in a manner intended to cancel the test signals out;
monitoring the combined test signals to determine the magnitude thereof; and
adjusting the effective length of one of said fibers to null the combined signal.

* * * * *